US009902251B2

United States Patent
Butts et al.

(10) Patent No.: US 9,902,251 B2
(45) Date of Patent: Feb. 27, 2018

(54) RECESS-MOUNTED HYDRAULIC PUMP CARTRIDGE AND WORK VEHICLE DRIVETRAIN THEREWITH

(71) Applicant: Deere & Company, Moline, IL (US)

(72) Inventors: Thomas Butts, Jesup, IA (US); Matthew B. Winhold, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/006,975

(22) Filed: Jan. 26, 2016

(65) Prior Publication Data

US 2017/0210219 A1 Jul. 27, 2017

(51) Int. Cl.
*B60K 6/12* (2006.01)
*F04C 2/10* (2006.01)
*F04C 2/18* (2006.01)

(52) U.S. Cl.
CPC ............... *B60K 6/12* (2013.01); *F04C 2/102* (2013.01); *F04C 2/18* (2013.01); *F04C 2210/20* (2013.01)

(58) Field of Classification Search
CPC ......... B60K 6/12; B60K 7/0015; F04C 2/102; F04C 2/18; F04C 2/14; F04C 2210/20
USPC ...................................................... 180/305
See application file for complete search history.

(56) References Cited

U.S. PATENT DOCUMENTS

| 6,447,270 | B1 * | 9/2002 | Schmidt | F04C 11/008 165/80.4 |
| 7,748,970 | B2 * | 7/2010 | Park | F04C 18/126 418/188 |
| 7,799,074 | B2 * | 9/2010 | Grimme | A61M 1/1081 418/61.3 |
| 7,896,123 | B2 * | 3/2011 | Ohashi | B60K 7/0015 180/242 |

(Continued)

FOREIGN PATENT DOCUMENTS

DE 19615725 A1 10/1997
DE 102008037152 A1 2/2009

(Continued)

OTHER PUBLICATIONS

Sauer Danfoss, Group 2 Gear Pumps, Technical Information, Revised Apr. 2013.

(Continued)

*Primary Examiner* — James A Shriver, II
*Assistant Examiner* — Brian L Cassidy
(74) *Attorney, Agent, or Firm* — Lorenz & Kopf, LLP

(57) ABSTRACT

A hydraulic pump is configured to mount within an internal receptacle defined by a housing of a hydraulically-powered component of a work vehicle. The pump has a housing defining one or more pump chambers. Each pump chamber communicates with a suction port and an outlet pressure port. Each pump chamber contains a pump assembly having a drive member at a fluid interface between the suction port and the outlet pressure port. The drive member is arranged for co-rotation with at least one power input component (Continued)

extending into the housing through each pump chamber. Rotation of each drive member displaces and pressurizes hydraulic fluid through the pump housing, and, when the pump is mounted within the internal receptacle, through internally ported passages routed through walls of the hydraulically-powered component housing.

8 Claims, 5 Drawing Sheets

(56) References Cited

U.S. PATENT DOCUMENTS

| | | | | |
|---|---|---|---|---|
| 7,942,645 B2* | 5/2011 | Nakatsuka | ............... | F01M 1/02 |
| | | | | 123/196 R |
| 8,215,430 B2* | 7/2012 | Thomson | ............. | B60K 7/0015 |
| | | | | 180/305 |
| 8,342,156 B2* | 1/2013 | O'Shea | .................. | F01C 21/02 |
| | | | | 123/495 |
| 8,342,815 B2* | 1/2013 | Watanabe | ............... | F04C 2/102 |
| | | | | 417/213 |
| 8,613,342 B2* | 12/2013 | Jackson | ................ | A01D 34/82 |
| | | | | 180/305 |
| 8,696,326 B2* | 4/2014 | Hadar | ..................... | F04B 17/03 |
| | | | | 417/310 |
| 8,820,354 B2* | 9/2014 | Ishikawa | ................. | B60K 6/12 |
| | | | | 137/614.16 |
| 9,291,173 B2* | 3/2016 | Ishikawa | ................. | B60K 6/12 |
| 9,394,901 B2* | 7/2016 | Hill | ............................ | F04C 2/14 |
| 2003/0072651 A1* | 4/2003 | Koshizaka | ............ | F04C 27/009 |
| | | | | 417/13 |
| 2004/0074678 A1* | 4/2004 | Irikura | ................... | A01D 69/03 |
| | | | | 180/6.48 |
| 2004/0131472 A1* | 7/2004 | Yamamoto | ............ | F04C 18/126 |
| | | | | 417/199.1 |
| 2005/0217919 A1* | 10/2005 | Okada | ..................... | F16H 39/14 |
| | | | | 180/305 |
| 2005/0236214 A1* | 10/2005 | Ohashi | ............... | A01D 34/6806 |
| | | | | 180/305 |
| 2007/0137918 A1* | 6/2007 | Dong | ................... | B60K 7/0015 |
| | | | | 180/305 |
| 2009/0032317 A1* | 2/2009 | Epshteyn | ................. | B60K 6/12 |
| | | | | 180/305 |
| 2016/0046271 A1* | 2/2016 | Speer | ..................... | B60T 8/368 |
| | | | | 418/199 |
| 2016/0230620 A1* | 8/2016 | Bucher | .................. | F04C 2/084 |
| 2016/0245084 A1* | 8/2016 | Rabhi | ....................... | F04B 9/10 |
| 2016/0245283 A1* | 8/2016 | Chikaoka | ............... | F04C 2/086 |
| 2016/0311307 A1* | 10/2016 | Faget | ...................... | B60K 6/00 |
| 2017/0016442 A1* | 1/2017 | Hazama | ..................... | F04C 2/10 |

FOREIGN PATENT DOCUMENTS

| | | |
|---|---|---|
| EP | 1927753 A2 | 6/2008 |
| JP | H09133084 A | 5/1997 |

OTHER PUBLICATIONS

Parker, Gear Pump Division, Vocational Truck Pump Program Catalog, Jul. 2010.

German Patent and Trade Mark Office, Search Report in German Patent Application No. 10 2017 201 152.1 dated Nov. 20, 2017.

* cited by examiner

RECESS-MOUNTED HYDRAULIC PUMP CARTRIDGE AND WORK VEHICLE DRIVETRAIN THEREWITH

STATEMENT OF FEDERALLY SPONSORED RESEARCH OR DEVELOPMENT

Not applicable.

FIELD OF THE DISCLOSURE

This disclosure relates to hydraulic pumps for driving hydraulically-powered components of work vehicles.

BACKGROUND OF THE DISCLOSURE

Work vehicles used in various industries, such as agriculture, construction and forestry, may have onboard hydraulic systems for powering various vehicle and implement systems and tools. The hydraulic systems are pressurized by one or more hydraulic pumps powered by the main engine or one or more variable drives (e.g., electric motors). Depending on the work vehicle, numerous hydraulic pumps may be needed to supply the pressure necessary for proper operation of the varied vehicle and implement systems, thus increasing the space envelope required for the hydraulics and the complexity of arranging the associated plumbing lines and input power sources.

SUMMARY OF THE DISCLOSURE

This disclosure provides a hydraulic pump cartridge that is mounted, at least in part, within the interior of a component of a work vehicle with at least some of the suction and outlet pressure flow being internally routed in the work vehicle component in which the pump is mounted.

In one aspect the disclosure provides a hydraulic pump mountable within an internal receptacle defined by a housing of a hydraulically-powered component of a work vehicle, the pump having a housing defining one or more pump chambers. Each pump chamber communicates with a suction port and an outlet pressure port and contains a pump assembly. Each pump assembly has a drive member at a fluid interface between the suction port and the outlet pressure port. The drive member is arranged for co-rotation with at least one power input component extending into the housing through each pump chamber. Rotation of each drive member drives each pump assembly to displace and pressurize hydraulic fluid through the pump housing, and, when the pump is mounted within the internal receptacle, through internally ported passages routed through walls of the hydraulically-powered component housing.

In another aspect the disclosure provides a drivetrain assembly for a work vehicle. A drivetrain housing contains a drivetrain component and defines an internal receptacle having an open end. The drivetrain housing has one or more walls defining internally ported suction and outlet pressure passages. A hydraulic pump is mounted to the drivetrain housing, at least in part, within the open end of the internal receptacle. The pump has a housing defining one or more pump chambers. Each pump chamber communicates with a suction port and an outlet pressure port and contains a pump assembly. Each pump assembly has a drive member between the suction port and the outlet pressure port. The suction port and the outlet pressure port communicate with associated ones of the suction and outlet pressure passages in the one or more walls of the drivetrain housing. A drive having a driveshaft extends into the pump housing and engages each drive member for co-rotation. Rotation of the driveshaft drives each drive pump assembly to displace and pressurize hydraulic fluid between the suction and outlet pressure passages of the drivetrain housing to supply hydraulic fluid to the drivetrain component.

In still another aspect the disclosure provides a work vehicle having a chassis supported by ground-engaging wheels or tracks and mounting a drivetrain assembly. The drivetrain assembly has a drivetrain housing containing a drivetrain component and defining an internal receptacle having an open end. The drivetrain housing has one or more walls defining internally ported suction and outlet pressure passages. A hydraulic pump is mounted to the drivetrain housing, at least in part, within the open end of the internal receptacle. The pump has a housing defining one or more pump chambers. Each pump chamber communicates with a suction port and an outlet pressure port and contains a pump assembly. Each pump assembly has a drive member between the suction port and the outlet pressure port. The suction port and the outlet pressure port communicate with associated ones of the suction and outlet pressure passages in the one or more walls of the drivetrain housing. A drive has a driveshaft extending into the pump housing and engaging each drive member for co-rotation. Rotation of the driveshaft drives each pump assembly to displace and pressurize hydraulic fluid between the suction and outlet pressure passages of the drivetrain housing to supply hydraulic fluid to the drivetrain component and drive the ground-engaging wheels or tracks.

The details of one or more implementations or embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
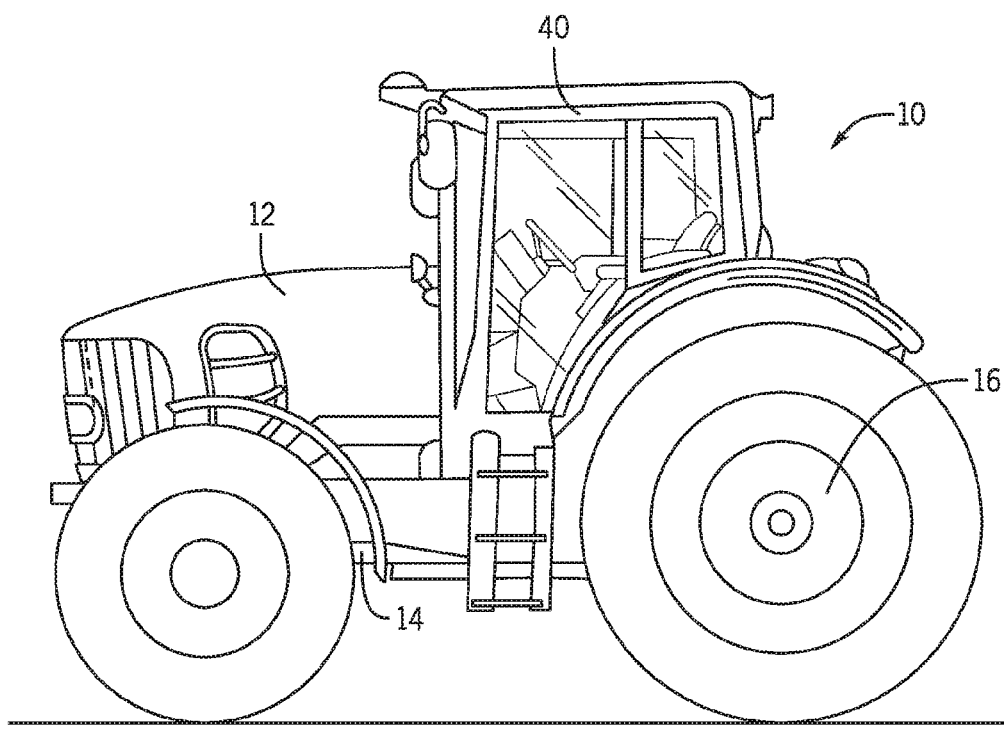
FIG. 1 is a side view of an example work vehicle in the form of an agricultural tractor having an example drivetrain arrangement as illustrated in accordance with an example embodiment of this disclosure.

The following describes one or more example embodiments of the disclosed hydraulic pump arrangement, as shown in the accompanying figures of the drawings described briefly above. Various modifications to the example embodiments may be contemplated by one of skill in the art.

As used herein, the term "axial" refers to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft. Furthermore, the term "radially" as used herein may refer to a direction or a relationship of components with respect to a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction.

Complex machinery, such as work vehicles and the like, may have a number of hydraulic components (e.g., drives, motors, actuators and so on) that power components that provide motive force to the vehicle or operate one or more of various implements. In work vehicle applications such as this (and others), hydraulic pressure may be generated by one or more hydraulic pumps that run off of the main power source (e.g., diesel engine) of the work vehicle. To simplify and reduce the space and cost requirements of such hydraulic systems, various hydraulic components may be combined or consolidated to power multiple components. For example, certain hydraulic systems may include multi-chamber or "stacked' hydraulic pumps in which one or more of the pump chambers are dedicated to power different components than the other chambers, supplying hydraulic fluid at the same or different output pressures. Such consolidated or stacked pump arrangements, however, may tend to be disproportionately sized in one or more dimensions, and thus impede the space-saving aspect of the consolidated pump.

The following describes a hydraulic pump cartridge that is well-suited to be physically mounted within the housing body of a hydraulically-powered component, for example, a drivetrain arrangement of a work vehicle. The pump may be useful to provide relatively high pressure hydraulic fluid for powering the hydraulically-powered component(s) or to provide relatively low pressure hydraulic fluid for cooling and/or lubricating the hydraulically-powered component(s). The internal mounting configuration of the pump promotes a space-conscious hydraulic system, thereby reducing the required space envelope on-board the work vehicle. Moreover, external or exposed hydraulic plumbing lines may be reduced or avoided by providing the hydraulic fluid to and from the respective suction and output pressure ports via internal hydraulic fluid porting.

In certain embodiments, the hydraulic pump may be recess-mounted into a housing body of a hydraulically-powered component. It should be understood that references to the hydraulic pump being recessed into the housing of the hydraulic-powered component include constructions in which the pump is directly and indirectly recessed into the particular hydraulically-powered component being served by the pump. For example, this includes the hydraulic pump being recessed mounted into a housing of a vehicle's drivetrain that provides hydraulic fluid to a component of the vehicle's drivetrain, such as a transmission assembly, in which case, the hydraulic pump is recessed-mounted to the vehicle drivetrain and indirectly recess-mounted to the transmission, which is the component being driven, cooled or lubricated. Of course, the hydraulic pump may be recessed-mounted directly into the housing of the transmission in other embodiments. Components with nested or other housing-within-housing arrangements are also envisioned.

The housing body may be formed with an open-ended cavity into which a housing of the hydraulic pump may be inserted. The cavity, and thus the pump housing and the hydraulic pump itself, may be mounted at any location of the hydraulically-powered component to facilitate a suitable hydraulic pressure interface and/or a suitable mechanical interface with the driving input from the hydraulic pump. In the case of an agricultural tractor, for example, the hydraulic pump may be recessed into the housing body of the drivetrain (e.g., in a central housing adjacent to the transmission) so that the output pressure ports are aligned with internal plumbing passages formed in the walls of the housing that lead to the transmission and so that the pump housing is aligned coaxially with a drive shaft that delivers power to the pump. Other mounting locations for the pump that emphasize assembly and service access may also be arranged.

In certain embodiments, the hydraulic pump may have multiple chambers, containing associated pumping components, for generating multiple, different output pressures. Each of the chambers may have dedicated sets of ports at the suction and pressure sides of the associated chamber. The chambers may also be in "tandem" or "stacked" or arranged linearly side-by-side along a reference axis of the pump. In the example hydraulic pump described below, the pump housing defines three chambers and associated pumping assemblies. However, the hydraulic pump may have a different number and layout of pump chambers.

Figure 5A:
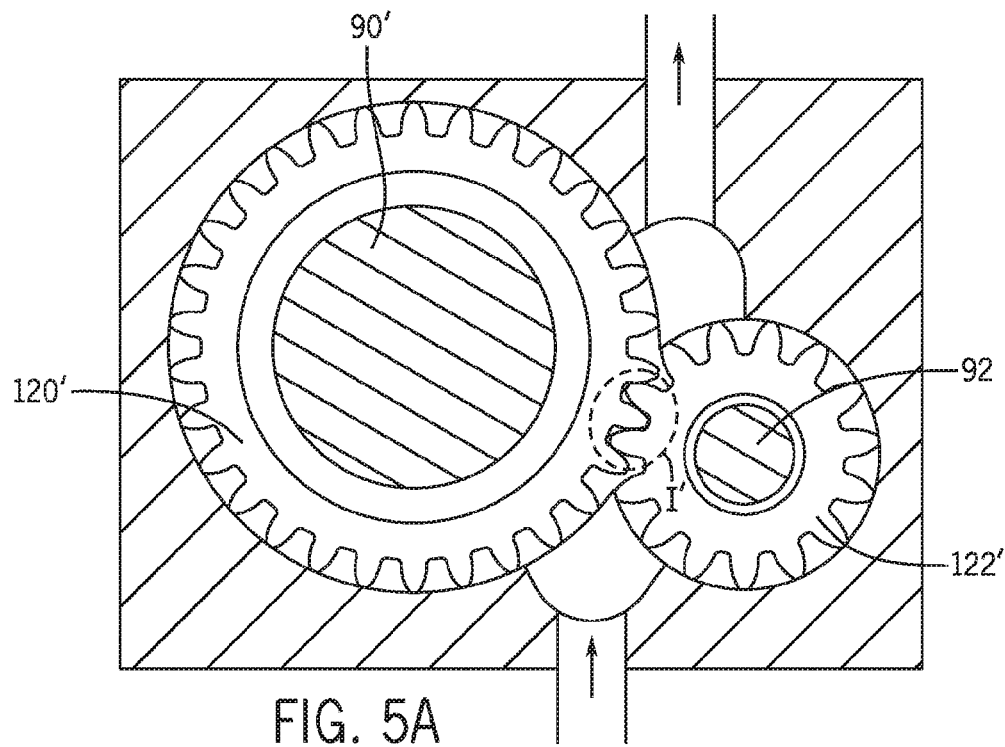
FIGS. 5A and 5B are sectional views depicting alternate example external and internal gear assemblies, respectively, for the hydraulic pump cartridge of FIG. 4.
Figure 5B:
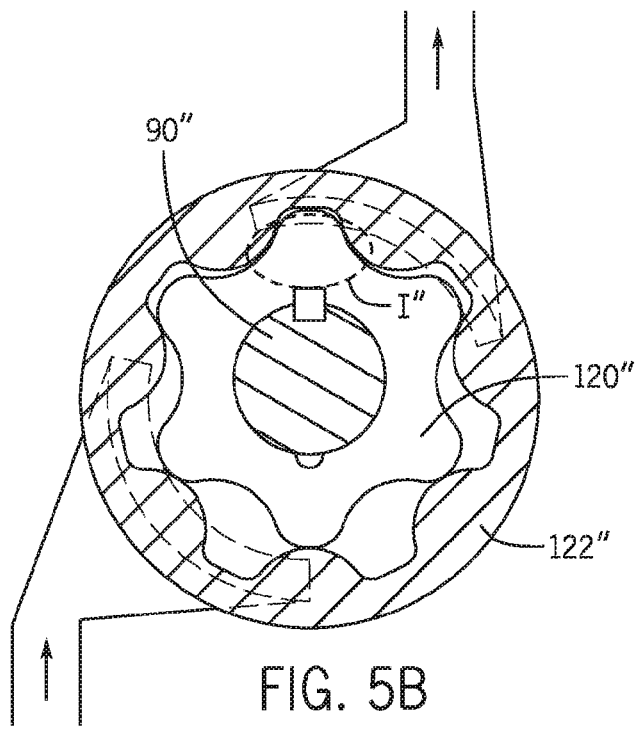

In certain other embodiments, the hydraulic pump may be a positive displacement pump of any suitable configuration, including single or multiple assemblies of rotary vane, axial piston and gear arrangements. Each pump chamber may thus include a pump assembly, which in the case of a gear pump, may include, for example, a gear set that forms an internal gear pump or an external gear pump. The terms "internal gear pump" and "external gear pump" as used herein refer to the configuration that the individual gear set or gear sets take in order to achieve displacement of the hydraulic fluid, rather than referring to the physical mounting position of the hydraulic pump with respect to the component to which it is mounted. Thus, as is understood in the art, FIGS. 5A and 5B provide example external and internal gear pump sets, respectively. Any of various other gear arrangements may also be incorporated into the hydraulic pump disclosed herein. Further, when the pump housing has multiple pump chambers aligned in a stacked configuration, a single input member (or set of input members) may be used to drive a drive member of each pump assembly. For example, a single input shaft may extend into the pump housing to drive rotation of a drive gear with respect to a driven gear in each gear set.

Referring now to the drawings, an example embodiment of the disclosure will be described in detail. As will become apparent from the discussion herein, a recess-mounted hydraulic pump may be used advantageously in a variety of settings and with a variety of machinery. For example, referring to FIG. 1, an example hydraulic pump will be described in connection with an example drivetrain of a work vehicle 10, which is depicted as an agricultural tractor.

It will be understood, however, that other configurations may be possible, including configuration of the work vehicle as a different kind of tractor or agricultural work vehicle, or as a work vehicle used in other industries, such as a log skidder used in the forestry industry or a motor grader used in the construction industry, or as one of various other types of work vehicles. It will further be understood that the disclosed hydraulic pump configuration may also be used in non-work vehicles and non-vehicle applications (e.g., fixed-location power trains and the like).

Figure 2:
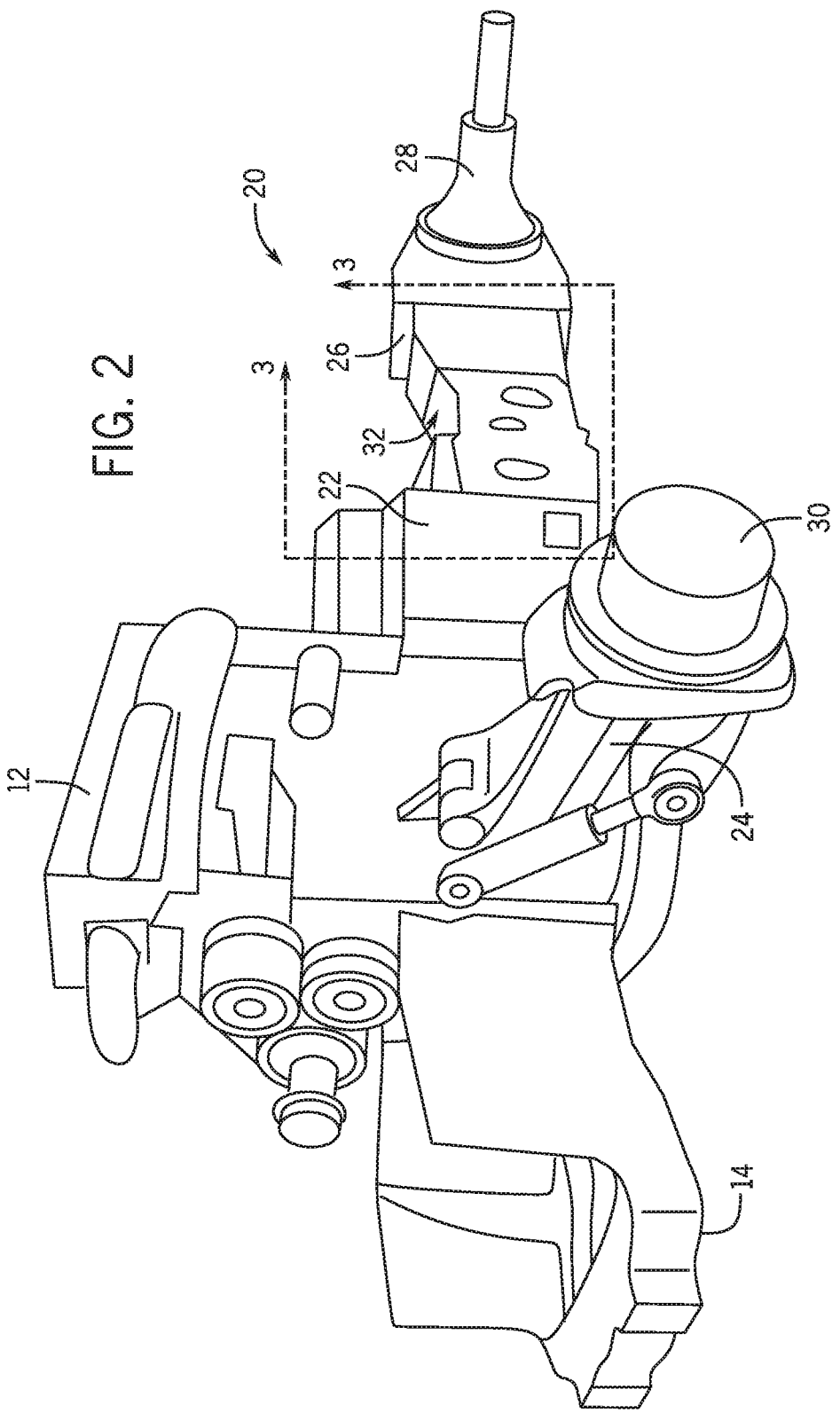
FIG. 2 is an isometric view of the example drivetrain of the work vehicle of FIG. 1.

As shown in FIGS. 1 and 2, the work vehicle 10 may include a power source, such as an internal combustion engine 12 (e.g., a diesel engine) and/or other infinitely variable drives (not shown) mounted to a chassis 14 supported by ground-engaging wheels 16. The chassis 14 may also support a drivetrain 20 that is powered by the engine 12. In certain embodiments, the drivetrain 20 may have a transmission 22, a front axle assembly 24, a differential assembly 26, and a rear axle assembly 28. Generally, the transmission 22 outputs power to the front and rear axle assemblies 24, 28, and final drives 30 mounted to the axles 24, 28 may provide final torque and speed reduction to rotate the wheels 16 and drive the work vehicle 10. A mid-frame 32 houses a main drive shaft 34 and an auxiliary drive shaft 36. The main drive shaft 34 couples the transmission 22 to the differential assembly 26 and from there to the rear axle assembly 28, and the auxiliary drive shaft 36 couples the transmission 22 to an implement drive assembly (e.g., a PTO shaft).

As is known to one skilled in the art, the transmission 22 can include a suitable gear transmission, which can be operated in a variety of ranges containing one or more gears, including, but not limited to a park range, a neutral range, a reverse range, a drive range, a low range, etc. A current range of the transmission 22 may be provided by a transmission control module in communication with a master vehicle controller (not shown), or may be provided by a sensor that observes a range shifter or range selection unit associated with the transmission 22, as known to one of skill in the art. The controller may output one or more control signals or control commands to the transmission 22 or transmission control module to limit the ranges available for the operation of the transmission 22. Hydraulic pressure inside the transmission is configured to move shifting components (e.g., to slide shift collars along shift rails or to energize clutch or brake packs to engage or disengage elements of one or more planetary sets) as needed to shift the transmission according to the operator input or programmed transmission control logic.

Generally, one or more controllers may be provided for control of various aspects of the operation of the work vehicle 10. As is understood in the art, each controller may be configured as a computing device with associated processor devices and memory architectures, as a hard-wired computing circuit (or circuits), as a programmable circuit, as a hydraulic, electrical or electro-hydraulic controller, or otherwise. As such, the controller(s) may be configured to execute various computational and control functionality with respect to the work vehicle 10 (or other machinery). In some embodiments, the controller(s) may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements. The controller may be in electronic, hydraulic, mechanical, or other communication with various other systems or devices of the work vehicle 10 (or other machinery). For example, the controller may be in electronic or hydraulic communication with various actuators, sensors, and other devices within (or outside of) the work vehicle 10, including various devices associated with the pumps, control valves, and so on. The controller(s) may communicate with other systems or devices (including other controllers) in various known ways, including via a CAN bus (not shown) of the work vehicle 10, via wireless or hydraulic communication means, or otherwise onboard the work vehicle 10, or at various remote locations.

Various sensors may also be provided to observe various conditions associated with the work vehicle 10. In some embodiments, various sensors (e.g., pressure, flow or other sensors) may be disposed near the pumps and control valves, or elsewhere on the work vehicle 10 or its implements. For example, the work vehicle 10 may include one or more pressure sensors that observe a pressure within the hydraulic circuit, such as a pressure associated with the transmission 22 or with the pumps.

In some embodiments, the controller(s) may be configured to receive input commands and to interface with an operator via a human-machine interface (not shown), which may be disposed inside a cab 40 of the work vehicle 10 for easy access by the operator. The human-machine interface may be configured in a variety of ways, for example as one or more joysticks, various switches or levers, one or more buttons, a touchscreen interface that may be overlaid on a display, a keyboard, a speaker, a microphone associated with a speech recognition system, or various other human-machine interface devices.

The work vehicle 10 also includes one or more pumps, which may be driven by the engine 12. Flow from the pumps may be routed through various control valves and various conduits in order to drive (and/or cool and lubricate) various hydraulically-powered components, such as the transmission 22 and other components of the drivetrain 20, the work vehicle 10 and any towed implements. The flow from the pumps may be controlled in various ways (e.g., through control of the various control valves), in order to cause movement the hydraulically-powered components (e.g., transmission 22). In this way, for example, a shifting of the transmission 22 into different ranges may be implemented by various control signals to the pumps, control valves, and so on.

In various embodiments, the hydraulic system may include a primary or master hydraulic pump that serves one or more component or system specific pumps and ties to a main fluid tank or reservoir. In other cases, one or more component or system specific pumps may pull directly form a dedicated or shared fluid reservoir. In any event, one or more of the component or system specific pumps are mounted to the component that is served by that particular pump, that is, to the component that is driven, cooled or lubricated by the hydraulic fluid output from that pump. The component housing is formed with a cavity into which the body of the pump housing may be inserted and recessed, at least partially, from the exterior of the component housing. The size, type and quantity of pumping assemblies contained in the pump housing are selected to fit within the housing cavity and may be determined by the application, in other words, by the size and type of hydraulically-powered component and the number of pressures and flow streams required by the component or components being served by the pump. Thus, the pump housing may include a single pump chamber containing a single pump assembly, or the pump housing may include multiple pump chambers, each containing one of multiple pump assemblies contained in the pump housing.

Figure 3:
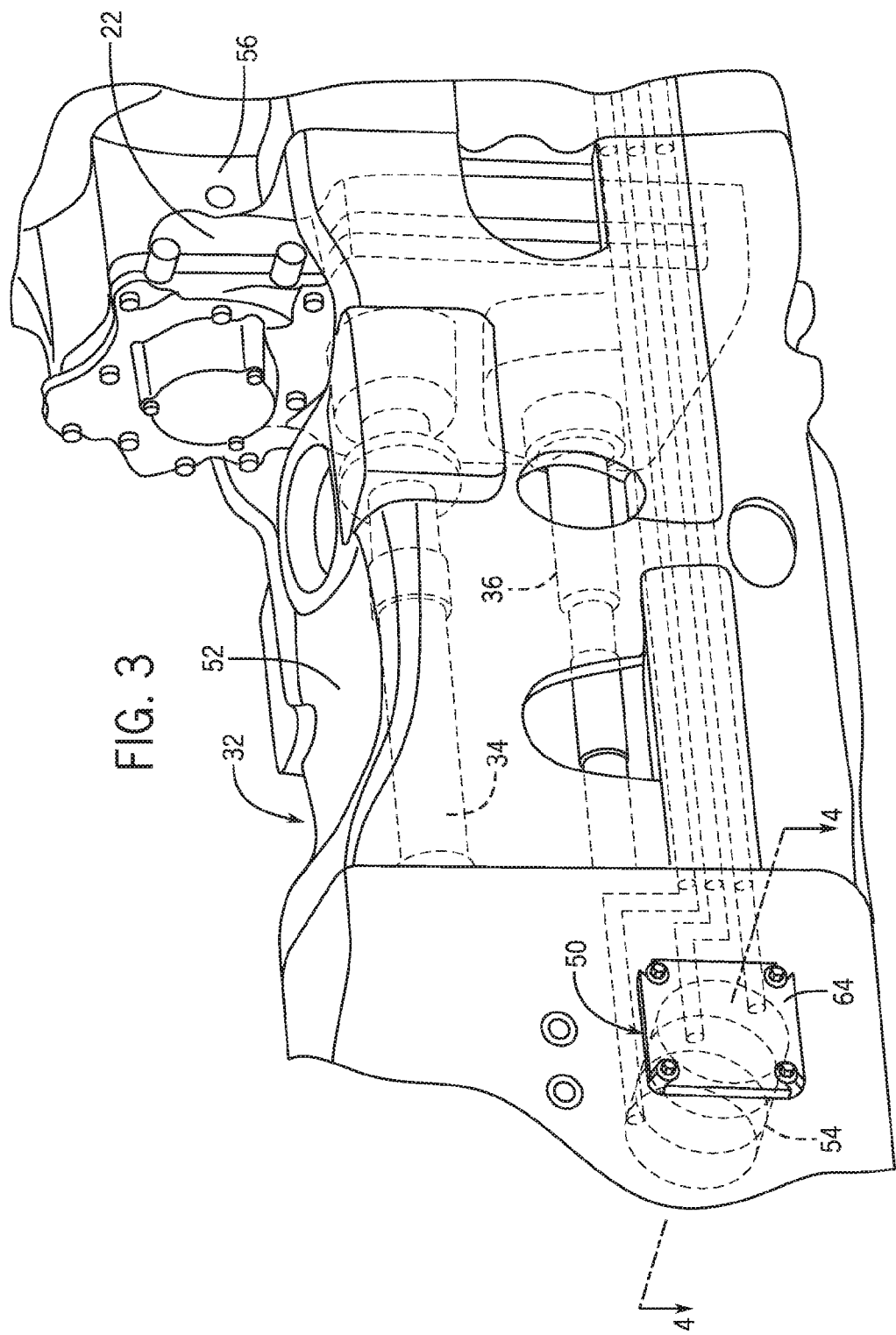
FIG. 3 is a partial isometric view of an example drivetrain component in the drivetrain of FIG. 2.
Figure 4:
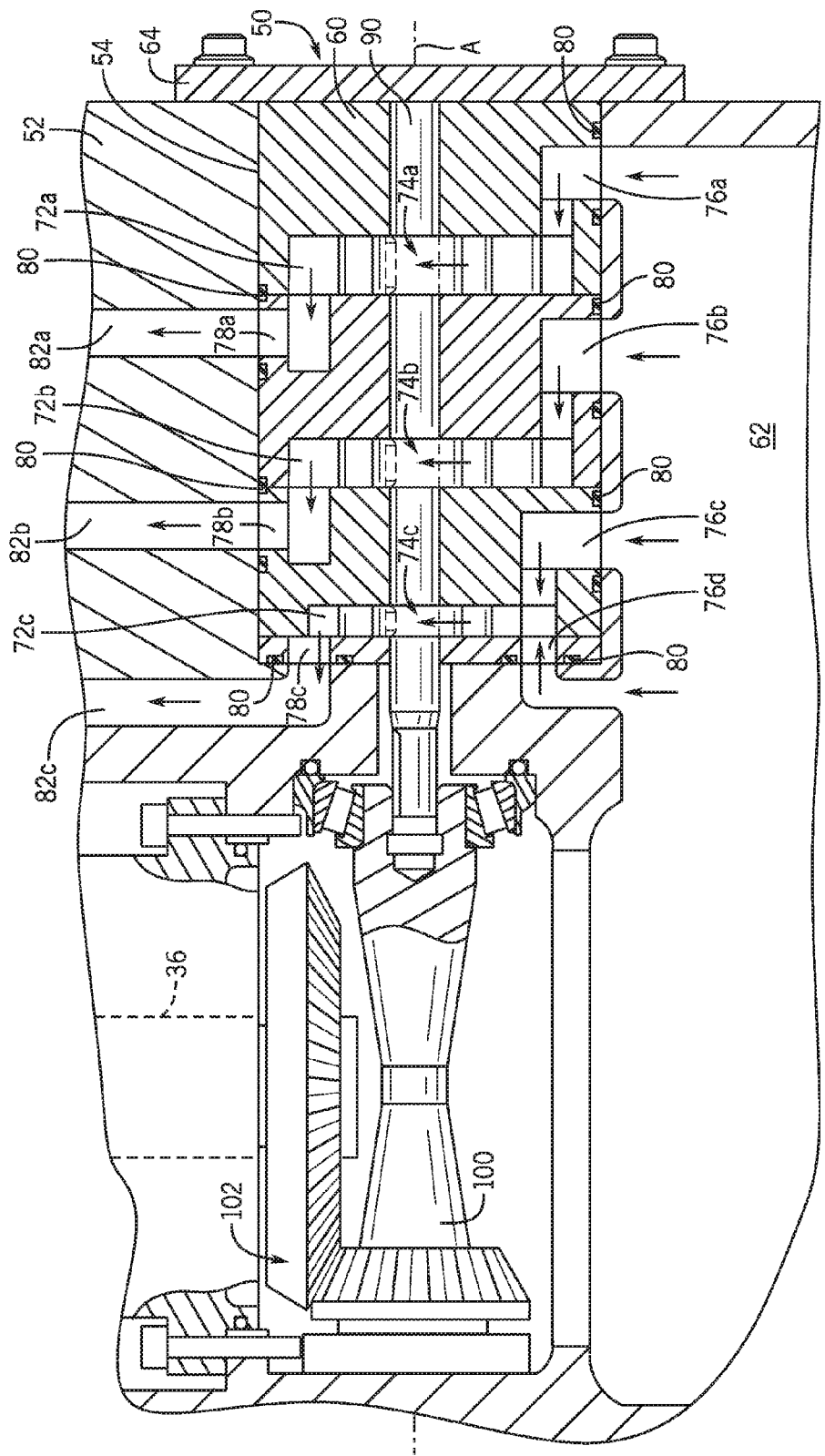
FIG. 4 is a partial sectional view of the example drivetrain component of FIG. 3, showing an example configuration of a recess-mounted hydraulic pump cartridge.

Referring now to FIGS. 3 and 4, an example hydraulic pump cartridge ("pump 50") for routing hydraulic fluid to the transmission 22 is illustrated. The pump 50 is mounted to a housing 52 of the drivetrain 20, specifically, recessed within a cavity 54 formed by the walls of the housing 52. In the illustrated example, the pump 50 delivers hydraulic fluid to the transmission 22. In this example, the transmission 22 has a housing 56, which surrounds the gears of the transmission assembly and which is contained in part within the housing 52. However, other configurations of either housing 52 or housing 56 may be made so that the housing 52 houses the transmission 22 without housing 56, or for housing 56 to be formed with a pump cavity similar to cavity 54.

The pump 50 is shown as a triple-chamber, stacked hydraulic pump. As mentioned, however, more or less chambers and pump assemblies may be provided. In the example, the pump 50 has a pump housing 60 disposed in the drivetrain housing 52 in or adjacent to a dedicated hydraulic fluid sump or reservoir 62 within the housing 52, generally in a horizontal orientation along a reference axis A, with its suction side down and pressure side up. At one axial end of the pump housing 60 is a mounting flange 64 sized larger than the opening to the cavity 54, which may be used to bolt or otherwise fasten the pump 50 to the housing 52. In the example construction, the mounting flange 64 is the only exposed portion of the pump 50 at the exterior of the housing 52, however, in other constructions portions of the cylindrical (or other) body of the pump housing 60 maybe exposed as well. One or more gaskets or seals (not shown) may be placed between the mounting flange 64 and the exterior of the housing 52, as needed.

Specifically, the example pump 50 includes a monolithic or sectioned cylindrical pump housing 60 formed (e.g., cast or machined) to include three pump chambers 72a, 72b, 72c collectively containing three pump assemblies 74a, 74b, 74c, respectively. Each pump chamber 72a-72c communicates with an associated suction port 76a, 76b, 76c and an associated output pressure port 78a, 78b, 78c. One or more of the pump chambers 72a-72c may have multiple discrete inlets or outputs. For example, an additional suction port 76d is provided for the pump chamber 72c in the illustrated example. As shown, the suction ports 76a, 76b, 76c and the output pressure ports 78a, 78b are radial openings (e.g., oblong, generally rectangular openings) spaced apart in the direction along the reference axis A. The output pressure ports 78a, 78b are axially offset with respect to the suction ports 76a, 76b, 76c, that is, the ports 76a, 78a are at different positions with respect to the direction along the reference axis A, as are ports 76b, 78b. Ports 76d, 78c are openings (e.g., arcuate or arched slots) formed in the axial (inner) end of the pump housing 60. All of the ports communicate fluid to and from the pump chambers 72a-72c via internal, generally axial passages. In the example pump 50, each of the three pump chambers 72a-72c has a different internal volume such that the associated pump assemblies 74a-74c displace different volumes of fluid and at different pressures. Two or more of the pump chambers 72a-72c may, instead, have the same internal volume with their associated pump assemblies may displace the same fluid volume at the same pressure.

Individual seals 80, such as O-rings, are contained in associated grooves ringing the suction 76a-76d and outlet pressure 78a-78c ports. Specifically, the seals 80 and associated grooves may have similar geometry as the ports (e.g., oblong rectangular rings or arcuate rings). Generally D-shaped rings and grooves may also be provided for the axial suction 76d and outlet pressure 78c ports. In other configurations, appropriately formed O-rings or other seals may be placed in grooves, either in the cylindrical outer diameter of the pump housing 60, or in the inner diameter of the cavity 54 if complementarily shaped. Further, if the pairs of suction and pressure ports are not offset, conventional circular O-rings and grooves may be used around the outer diameter of the pump housing 60 between the set of suction-pressure ports of each pump chamber 72a-72c. When the pump 50 is inserted into the cavity 54 and mounted to the housing 52, the seals 80 fluidly seal off the interface between the pump housing 60 and the housing 52, which may define internal flow passages 82a, 82b, 82c to deliver hydraulic fluid to the transmission 22, for example, and thus avoid external or internal plumbing lines and the associated assembly and leakage complexities thereof.

In the example pump 50, the pump housing 60 has a central cylindrical passage extending through and between each axial end that receives an input component, such as input shaft 90. The input shaft 90 extends through the pump housing 60 and interacts with each of the pump assemblies 74a-74c to displace and pressurize the hydraulic fluid. The input shaft 90 may be mounted for rotation with respect to the housing 52 and the pump housing 60 by one or more bearings (e.g., roller bears) or bushings (not shown) at one or both ends. As shown in FIG. 4, the input shaft 90 may be connected (e.g., directly coaxially mounted) to an intermediate drive shaft 100, which is coupled via a gear arrangement 102 (e.g., spiral bevel gear set) to the auxiliary drive shaft 36 (e.g., which drives a PTO shaft), which is mechanically coupled to the engine 12 for rotation. One or more other pumps, such as a recess-mounted implement hydraulic pump cartridge (not shown), may also be coupled to the auxiliary drive shaft 36 by the gear arrangement 102. Rotation of the intermediate drive shaft 100 thus drives rotation of the input shaft 90 (and may also drive a corresponding shaft of an implement hydraulic pump), which drives the pump assemblies 74a-74c. It should be noted that the input shaft 90 may be one of multiple drive shafts (e.g., coaxially nested shafts) each separately driving an associated one of the pump assemblies 74a-74c.

The pump assemblies 74a-74c may be any suitable type of pump mechanism mountable within the pump housing 60 and capable of effecting the flow volumes and pressures of hydraulic fluid desired. For example, any number of positive displacement pump configurations may be utilized, such an known internal or external gear pumps, axial piston pumps and rotatory vane pumps. Each pump assembly may be of the same or different type or construction from one or more of the others within the same pump 50. Various mechanisms and techniques for improved efficiency and reduced loss may also be incorporated into the hydraulic pump. For example, the pump assemblies may be external gear pumps having "balance" plates that adjust to close off the open spaces adjacent the gear faces, and thereby reduce losses between the suction and pressure sides of the pump.

By way of non-limiting examples, the pump 50 may have the following construction and flow characteristics. With reference to FIGS. 4 and 5A, each pump assembly 74a-74c may be an external gear pump, with each gear pump having a drive gear 120' and a driven gear 122' arranged on separate parallel shafts, the drive gear 120' being mounted for co-rotation to the input shaft 90' and the driven gear 122' being mounted to an idler shaft 92 (either shared with or separate from the other gear pumps). The drive gear 120' and the driven gear 122' have peripheral teeth that mesh at an interface region I' that separates the suction side (e.g., the associated suction port) from the pressure side (e.g., the associated output pressure port) of the associated pump chamber. Rotation of the drive gear 120' turns, by intermeshing of the gear teeth, the driven gear 122', and thereby displaces hydraulic fluid, pulling from the reservoir 62, and pressurizes the output side of the pump 50.

Referring to FIGS. 4 and 5B, each pump assembly 74a-74c instead may be an internal gear pump, with each gear pump having an inner drive gear 120" mounted for co-rotation to the input shaft 90" and a driven gear 122" being mounted about the drive gear 120". The drive gear 120" has outer peripheral teeth and the driven gear 122" has inner peripheral teeth that mesh with the drive gear teeth at an interface region I" that separates the suction side (e.g., the associated suction port) from the pressure side (e.g., the associated output pressure port) of the associated pump chamber. Rotation of the drive gear 120" turns, by intermeshing of the gear teeth, the driven gear 122", and thereby displaces hydraulic fluid, pulling from the reservoir 62, and pressurizes the output side of the pump 50.

Further, in these examples, the pump chambers have different internal volumes, such that gear pump 74a displaces 45 cubic centimeters (cc) at 10 bar, gear pump 74b displaces 41 cc at 8 bar, and gear pump 74c displaces 17 cc at 25 bar. In this case, the pump 50 may be suitable to deliver three streams of hydraulic fluid to the transmission 22 for three distinct purposes. For example, the gear pump 74a may deliver hydraulic fluid to specific heat-generating concentration (or other) areas of the transmission 22 for purposes of cooling. The gear pump 74b may deliver hydraulic fluid to high wear (or other) areas of the transmission 22 for purposes of lubrication. The higher pressure generating gear pump 74c may deliver hydraulic fluid to actuate gear shifting (or other) components of the transmission for purposes of transmission control. And, by way of example only, in these examples, the pump 50 may operate at a speed in the range of about 1,000-3,000 rpm.

There have thus been described embodiments of a recessed hydraulic pump cartridge, which is advantageously utilized with, and recess-mounted in, a hydraulically-powered component, such as a drivetrain component (e.g., transmission 22) suitable for usage within a work vehicle. The recessed pump cartridge includes one or more discrete or distinct pump assemblies contained within a single housing or manifold, which is recessed into a cavity in the housing of the component that the pump serves. This self-contained arrangement reduces the "footprint" or space envelop occupied by the hydraulic system onboard the work vehicle. In addition, the internal mounting arrangement of the pump allows for flow passages to be formed within the walls of the component's housing, reducing or removing the need for external plumbing lines. This further reduces potential leakage points and improves the operational life of the hydraulic components and the overall operability of the transmission, drivetrain and work vehicle. Stacked pump embodiments of the pump arrangement having multiple pump assemblies allow a single pump housing to provide different output pressures (e.g., relatively high pressure flow for driving component actuation and relatively low pressure flow for cooling or lubrication). Such stacked pump configurations further leverage the space saving and improved operation of the disclosed recessed pump arrangement.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A drivetrain assembly for a work vehicle, comprising:
    a drivetrain housing containing a drivetrain component and defining an internal receptacle having an open end, the drivetrain housing having one or more walls defining internally ported suction and outlet pressure passages; and
    a hydraulic pump mounted to the drivetrain housing, at least in part, within the open end of the internal receptacle, the pump having a housing defining one or more pump chambers, the one or more pump chambers communicating with an associated suction port and an associated outlet pressure port and containing an associated pump assembly, the associated pump assembly having a drive member between the associated suction port and the associated outlet pressure port, the associated suction port and the associated outlet pressure port communicating with associated ones of the suction and outlet pressure passages in the one or more walls of the drivetrain housing; and
    an input shaft extending into the pump housing and engaging for co-rotation the drive member of the pump assembly for the associated one or more pump chambers;
    wherein rotation of the input shaft drives the pump assembly of the associated one or more pump chambers to displace and pressurize hydraulic fluid between the associated ones of the suction and outlet pressure passages of the drivetrain housing to supply hydraulic fluid to the drivetrain component.

2. The drivetrain assembly of claim 1, wherein there are a plurality of pump chambers arranged in tandem along a reference axis.

3. The drivetrain assembly of claim 1, wherein the pump housing includes an end wall configured to fit within the internal receptacle of the drivetrain housing and a mounting flange configured to interface with an exterior surface of the drivetrain housing.

4. The drivetrain assembly of claim 3, wherein at least one of the end wall and the mounting flange has an opening therein receiving the input shaft.

5. The drivetrain assembly of claim 2, wherein each pump chamber has a dedicated set of suction and outlet pressure ports.

6. The drivetrain assembly of claim 1, wherein the associated pump assembly of the one or more pump chambers is a positive displacement pump assembly selected from the group consisting of an internal gear set, an external gear set, a rotary vane arrangement and an axial piston arrangement.

7. The drivetrain assembly of claim 2, wherein the pump housing defines at least three pump chambers.

8. The drivetrain assembly of claim 2, wherein the pump assembly in each pump chamber effects a different displacement.

* * * * *